United States Patent [19]

Bertelli et al.

[11] 4,312,805

[45] Jan. 26, 1982

[54] SELF-EXTINGUISHING POLYMER COMPOSITIONS

[75] Inventors: Guido Bertelli; Pierpaolo Roma; Renato Locatelli, all of Ferrara, Italy

[73] Assignee: Montedison, S.p.A., Milan, Italy

[21] Appl. No.: 868,337

[22] Filed: Jan. 10, 1978

[30] Foreign Application Priority Data

Jan. 12, 1977 [IT] Italy .............................. 19218 A/77

[51] Int. Cl.³ .............................................. C08K 3/32
[52] U.S. Cl. ............................ 260/45.9 NP; 525/157; 525/184
[58] Field of Search ................. 260/45.9 NP, 849, 854, 260/857 L, 859 R, 858, 852, 850, 856, 857 G, 857 PE, 857 TW, 859, 45.9 R

[56] References Cited

U.S. PATENT DOCUMENTS

| 3,037,951 | 6/1962 | Basto et al. | 260/45.9 NP |
| 3,136,735 | 6/1964 | Stott | 260/857 L |
| 3,272,890 | 9/1966 | O'Leary | 260/859 R |
| 3,423,343 | 1/1969 | Barnett | 260/45.9 NP |
| 3,562,197 | 2/1971 | Sears et al. | 260/45.9 NP |
| 3,600,341 | 8/1971 | Schmidt et al. | 260/45.9 NP |
| 3,660,344 | 5/1972 | Michael et al. | 260/45.8 NT |
| 3,773,743 | 11/1973 | Ainsworth | 260/45.9 R |
| 3,810,862 | 5/1974 | Mathis et al. | 260/45.9 NP |
| 3,931,101 | 1/1976 | Davy et al. | 260/45.8 NT |
| 3,936,416 | 2/1976 | Brady | 260/45.9 NP |
| 4,026,810 | 5/1977 | Bost | 260/45.9 R |

OTHER PUBLICATIONS

Ind. Eng. Chem., Prod. Res. Develop., vol. 13, No. 2, (1974) pp. 139 to 143–Gilleo.
Amer. Chem. Soc. Div. Organic Coatings and Plastic Chem. Preprints, vol. 28, No. 1, (1968) pp. 237-242-Miles et al.

Primary Examiner—V. P. Hoke
Attorney, Agent, or Firm—Morgan, Finnegan, Pine, Foley & Lee

[57] ABSTRACT

There are provided self-extinguishing compositions comprising, for each 100 parts of a polyolefin as such or containing inert fillers and/or other additives, from 5 to 30 parts of an ammonium or amine phosphate, from 3 to 20 parts of one or more nitrogen organic compound which, upon heating in the presence of the ammonium or amine phosphate, decompose to form a non-dripping carbonaceous mass, the nitrogen-containing compounds being selected from among (a) reaction products of aliphatic or aromatic diisocyanates or triisocyanates and organic compounds having reactive hydrogen atoms;
(b) a mixture of (a) and/or an aldehyde/amine or aldehyde/urea reaction product with a polyamide; and
(c) a mixture of an amine with a polyamide.

The foregoing compositions provide acceptable levels of self-extinguishing properties without being corrosive or emitting toxic smokes or gases in the proximity of an open flame.

11 Claims, No Drawings

SELF-EXTINGUISHING POLYMER COMPOSITIONS

BACKGROUND OF THE INVENTION

To the prior art are known a number of different processes for rendering polymers incombustible. Such processes in general are based on the use of metal compounds, especially antimony compounds, in combination with thermally unstable halogenated compounds such as, for instance, chlorinated paraffin waxes.

The metal compound + halogenated compound combination yield satisfactory results as far as the self-extinguishing properties they confer to the polymers are concerned, but they show serious drawbacks, such as: corrosion phenomena in the pieces of equipment in which these materials are processed, and heavy emission of toxic smokes and gases in the case of fire. Moreover, acceptable levels of self-extinguishing properties are achieved only when high concentrations of such combinations are used.

OBJECTS OF THE INVENTION

It is an object of this invention to provide thermoplastic polymers having self-extinguishing properties but which are free of the drawbacks of the above-mentioned prior art compositions.

Other objects of the invention will be apparent from the discussion which follows:

SUMMARY OF THE INVENTION

Self-extinguishing polymeric compositions, comprising for 100 parts of a thermoplastic polymer as such or containing inert fillers and/or other additives:
(1) from 5 to 30 parts of an ammonium or amine phosphate; and
(2) from 3 to 20 parts of one or more nitrogen containing organic compounds which, on heating in the presence of component (1), decompose under formation of a non-dripping carbonaceous mass, said nitrogen containing compounds being selected from amongst:
  (a) reaction products of aliphatic or aromatic diisocyanates or triisocyanates with organic compounds having reactive hydrogen atoms in the molecule;
  (b) a mixture of component (a) and/or of an aldehyde/amine or aldehyde/urea reaction product with a nitrogen containing compound having the group —$CONH(CH_2)_n$— wherein n is an integer having the value of at least 1; and
  (c) a mixture of an amine with a nitrogen containing compound having the —$CONH(CH_2)_n$— group, wherein n has the above indicated meaning.

GENERAL DESCRIPTION OF THE INVENTION

It has now surprisingly been found that it is possible to confer self-extinguishing properties to thermoplastic polymers of the above indicated type, by addition of special additives which do not give place to the already described drawbacks.

The compositions object of the present invention comprise per 100 parts of thermoplastic polymer as such or containing inert fillers and/or the additives normally used in the technology of the field:
(1) from 5 to 30 parts of an ammonium or amine phosphate; and
(2) from 3 to 20 parts of one or more nitrogen containing organic compounds which on heating, in the presence of component (1), decompose under formation of a carbonaceous non-dripping mass, said nitrogen containing compounds being selected from amongst:
  (a) reaction products of aliphatic or aromatic diisocyanates or triisocyanates with organic compounds having in the molecule reactive hydrogen atoms;
  (b) a mixture of component (a) and/or of a reaction product aldehyde/amine or aldehyde/urea with a nitrogen containing compound having the —$CONH(CH_2)_n$— group, wherein n is an integer having the value of at least 1; and
  (c) a mixture of an amine with a nitrogen containing compound having the —$CONH(CH_2)_n$— group.

Of the various usable phosphates, the ones preferred for their easy availability are the ammonium polyphosphates falling under the general formula $(NH_4)_{n+2}P_nO_{3n+1}$ wherein n represents an integer equal to or greater than 2; the molecular weight of the polyphosphates must preferably be sufficiently high so as to ensure a low solubility in water.

The composition of the polyphosphates falling under the above cited general formula, wherein n is a sufficiently great number, is that corresponding to the formula of the metaphosphates $(NH_4PO_3)_n$.

An example of such polyphosphates is that known under the trade mark "Exolit 263" (produced and sold by Benckiser Knapsack GmbH) and having the composition $(NH_4PO_3)_n$ wherein n is greater than 50; another example is the product known under the trade mark "Phos-Check P/30" (a product manufactured and sold by MONSANTO CHEMICAL CO.) and having an analogous composition.

Other usable phosphates are those derived from amines such as for instance: dimethylammonium or diethylammonium phosphate, ethylendiamine phosphate, melamine ortho- or pyrophosphate and others still.

Amongst the organic isocyanates usable in the reaction with the compounds having reactive hydrogen, there may be cited: hexamethylene diisocyanate, 2.4- and 2.6-toluilene diisocyanate, o-, m- and p-phenylene diisocyanate, diphenylmethane-4.4'-diisocyanate, dianisidine diisocyanate and tolidine diisocyanate.

Representative examples of organic compounds having reactive hydrogen atoms in the molecules, are: ethylene-urea, ethylene-thiourea, idantoine, hexahydripyrimidin-2-one, piperazin-3.6-dione, barbituric acid; uric acid, indigotine, urea, ethylene diamine, tetramethylene diamine, phenylene diamine, toluilene diamine, xylylene diamine, melamine, and besides polyvalent alcohols such as: ethylene glycol, diethylene glycol, triethylene glycol, glycerol, trimethylol-ethane, trimethylol-propane, pentaerithritol, dipentaery-thritol, tripentaerythritol, 1.2.4-butane-triol and other like compounds.

The aldehyde that preferably is reacted with amine or with urea is formaldehyde; amongst such amines there may be cited: melamine, phenylene diamines, cyclohexylene diamines, toluylene-2.4-diamine, tri-, tetra- and hexamethylene diamine, 1.2-butylene diamine, piperazine and diethylene triamine.

Examples of organic compounds having the —CONH(CH$_2$)$_n$— group are the polyamides such as Nylon 6 and Nylon 66.

The reaction products between the polyisocyanates and the compounds having reactive hydrogen atoms are prepared by introducing the two reactants into a flask of a rotating evaporator and heating the suspension thus obtained to a temperature comprised between 100° and 180° C., for a time varying from 1 to 3 hours, depending on the temperature chosen: if, for instance, the temperature is equal to 150° C., 2 hours of heating will be sufficient.

Practically the reaction between the two compounds develops stoichiometrically in the sense that each functional group of one of the reactants reacts with one functional group of the other reactant. It follows that the molar ratio between the two reactants will depend on the number of functional groups present in each of the reactants. Thus, for instance, a diisocyanate will be reacted with pentaerythritol in the molar ratio 2:1, while it will be reacted with urea in the molar ratio 1:1.

At the end of the reaction there will be obtained a solid product which will be washed with acetone, then with water and finally again with acetone in order to remove the unreacted compounds.

The reaction products of the aldehydes with the amines or with urea are prepared according to known methods: an aqueous solution of the amine or of urea, acidified with H$_2$SO$_4$ (pH=2÷3), is made to react at 80°-100° C. under stirring with an aqueous solution of formaldehyde at a concentration of 37% by weight which is added dropwise in an amount of 1÷1.5 mols per functional group present in the amine compound. For the reaction there may be used a glass flask fitted with a dropping funnel, a stirrer and a reflux cooler.

The polycondensate that is obtained precipitates in the form of a finely divided powder which is filtered, washed and finally dried.

The compositions according to this invention may be obtained according to known methods: for instance, the polymer and the anti-flame additives are mixed together in a Banbury type blade mixer at the plastifying temperature of the polymer.

The mix thereby obtained is then extruded in a DOL-CI-type extruder (screw diameter=20 mm; ratio length/diameter of the screw=23; screw speed=20 r.p.m.) at the temperature most suited for obtaining a granular product, this temperature varying from polymer to polymer.

For the determination of the self-estinguishing properties of the polymer compositions object of this invention, in general one proceeds as follows: With the granular product, 3 mm thick plates are made on a small CARVER type press, operating for 7 minutes at a pressure of 40 kg/sq.cm and at a suitable temperature that will vary from polymer to polymer.

On the plates thus prepared one determines the level of the self-estinguishing properties either by measuring (according to ASTM D-2863 standards) the "oxygen index," which expresses the minimum percentage of O$_2$ in a O$_2$/N$_2$ mixture necessary for the sample to burn continuously, or by applying the UL-94 rules (published by "Underwriters Laboratories" USA) which allow an evaluation of the degree of the self-extinguishing properties of the plastic materials.

The UL-94 rules foresee different test conditions which are more or less severe and permit the classification of the sample at various degrees of self-extinguishing characteristics.

SPECIFIC DESCRIPTION OF THE INVENTION

In the tests recorded on Tables I, II and III, there has been adopted the "Vertical Burning Test" permits the classification of the material at the decreasing levels 94V-0, 94V-1 and 94V-2.

Each test is carried out on a set of 5 specimens that may have a thickness of ¼, ⅛ or 1/16 inch.

The specimen, maintained in a vertical position by a suitable support, is primed by a flame at the lower end and there are carried out 2 ignition attempts, each of the duration of 10 seconds.

The three levels of self-extinguishing characteristics mentioned above may be briefly defined as follows:

94V-0: No test piece burns for more than 10 seconds after each application of the flame, nor does it drop lit particles. Moreover, the total combustion time does not exceed 50 seconds for the 10 attempts carried out on the set of 5 test pieces.

94V-1: Combustion times of up to 30 seconds for the single test piece and of up to 250 seconds for the 10 attempts carried out on the set of 5 test pieces are allowed. Also at this level no test piece lets drop lit particles.

94V-2: The allowed combustion times are those of level 94V-1, except that there is allowed the dropping of lit particles.

TABLES I and II show the results obtained when adding to polypropylene the additives of this invention.

TABLE III shows the unsatisfactory results of some comparative tests carried out using additives similar to those already described but that fall outside the scope of this invention.

TABLE I

Self-estinguishing compositions based on polypropylene and components of type (a).

| Ingredients | Parts by weight | | | | |
|---|---|---|---|---|---|
| | Ex. 1 | Ex. 2 | Ex. 3 | Ex. 4 | Ex. 5 |
| Polypropylene | 70 | 70 | 75 | 75 | 75 |
| Ammonium polyphosphate | 20 | 20 | 17 | 17 | 17 |
| Pentaerythritol/toluylene-2,4-diisocyanate | 10 | | | | |
| Melamine/toluylene-2,4-diisocyanate | | 10 | | | |
| Ethylenethiourea/toluylen-2,4-diisocyanate | | | 8 | | |
| Urea/toluylene-2,4-diisocyanate | | | | 8 | |
| Ethylenethiourea/diphenylmethane-4,4'-diisocyanate | | | | | 8 |
| Oxygen index | 28 | 29.5 | 27 | 25 | 26.5 |
| UL-94 (⅛ inch) | V-0 | V-0 | V-0 | V-2 | V-0 |

TABLE II

Self-estinguishing compositions based on polypropylene and components of type (b) or (c).

| Ingredients: | Ex. 6 | Ex. 7 | Ex. 8 | Ex. 9 | Ex. 10 | Ex. 11 | Ex. 12 | Ex. 13 |
|---|---|---|---|---|---|---|---|---|
| Polypropylene | 70 | 70 | 70 | 70 | 70 | 70 | 70 | 70 |
| Ammonium polyphosphate | 15 | 15 | 15 | 15 | 15 | 15 | 15 | 15 |
| Renyl 6* | 10 | 10 | 10 | 10 | 10 | 10 | 10 | 10 |
| Melamine | 5 | | | | | | | |
| Melamine/formaldehyde | | 5 | | | | | | |
| Melamine/toluylene-2,4-diisocyanate | | | 5 | | | | | |
| Laurylamine | | | | 5 | | | | |
| Diethanolamine | | | | | 5 | | | |
| Hexamethylenetetramine | | | | | | 5 | | |
| Tributylamine | | | | | | | 5 | |
| Urea/formaldehyde | | | | | | | | 5 |
| Oxygen Index | 29 | 29.5 | 29.5 | 27.5 | 27 | 28 | 26.5 | 28 |
| UL-94 (⅛ inch) | V-0 | V-0 | V-0 | V-0 | V-0 | V-0 | V-0 | V-0 |

*Polyamide 6 (Montedison) from caprolactam.

TABLE III

Comparative Tests

| Ingredients: | Test A | Test B | Test C | Test D |
|---|---|---|---|---|
| Polypropylene | 75 | 75 | 75 | 75 |
| Ammonium polyphosphate | 17 | 17 | 17 | 17 |
| Melamine | 8 | | | |
| Melamine/formaldehyde | | 8 | | |
| Urea | | | 8 | |
| Urea/formaldehyde | | | | 8 |
| Oxygen Index | 21 | 23.5 | 20.5 | 22.5 |
| UL-94 (⅛ inch) | burns | burns | burns | burns |

We claim:

1. Self-extinguishing polymeric compositions, comprising for 100 parts of a polyolefin as such or containing inert fillers:
   (1) from 5 to 30 parts of ammonium or amine phosphate; and
   (2) from 3 to 20 parts of one or more nitrogen containing organic compounds which, on heating in the presence of said ammonium or amine phosphate, decompose under formation of a non-dripping carbonaceous mass, said nitrogen containing compound being selected from the group consisting of:
   (1) a mixture of a polyamide and melamine,
   (2) a mixture of a polyamide and a reaction product of melamine/formaldehyde, (3) a mixture of a polyamide and a reaction product of melamine/-toluylene-2, 4-diisocyanate, (4) a mixture of a polyamide and laurylamine, (5) a mixture of a polyamide and diethanolamine, (6) a mixture of a polyamide and hexamethylene-tetramine, (7) a mixture of a polyamide and tributylamine and (8) a mixture of a polyamide and a reaction product of urea/formaldehyde.

2. Polymeric compositions according to claim 1, in which said ammonium phosphate is a polyphosphate having the composition $(NH_4PO_3)_n$ wherein n is greater than 50.

3. Polymeric compositions according to claim 1, in which the nitrogen containing compound is a mixture of a polyamide and melamine.

4. Polymeric compositions according to claim 1, in which the nitrogen containing compound is a mixture of a polyamide and a reaction product of melamine/formaldehyde.

5. Polymeric compositions according to claim 1, in which the nitrogen containing compound is a mixture of a polyamide and a reaction product of melamine/toluylene-2,4-diisocyanate.

6. Polymeric compositions according to claim 1, in which the nitrogen containing compound is a mixture of a polyamide and laurylamine.

7. Polymeric compositions according to claim 1, in which the nitrogen containing compound is a mixture of a polyamide and diethanolamine.

8. Polymeric compositions according to claim 1, in which the nitrogen containing compound is a mixture of a polyamide and hexamethylene-tetramine.

9. Polymeric compositions according to claim 1, in which the nitrogen containing compound is a mixture of a polyamide and tributylamine.

10. Polymeric compositions according to claim 1, in which the nitrogen containing compound is a mixture of a polyamide and a reaction product of urea/formaldehyde.

11. Polymeric compositions according to claim 1, in which the polyolefin is polypropylene.